(12) United States Patent
Van Dervelde et al.

(10) Patent No.: US 7,664,070 B2
(45) Date of Patent: Feb. 16, 2010

(54) METHOD FOR PROVIDING A MULTICAST AND/OR BROADCAST SERVICE IN A MOBILE TELECOMMUNICATIONS NETWORK

(75) Inventors: Himke Van Dervelde, Staines (GB); Gert-Jan Van Lieshout, Staines (GB)

(73) Assignee: Samsung Electronics Co., Ltd (KR)

( * ) Notice: Subject to any disclaimer, the term of this patent is extended or adjusted under 35 U.S.C. 154(b) by 680 days.

(21) Appl. No.: 11/100,742

(22) Filed: Apr. 7, 2005

(65) Prior Publication Data

US 2005/0237972 A1    Oct. 27, 2005

(30) Foreign Application Priority Data

Apr. 7, 2004    (GB) ................... 0407929.9

(51) Int. Cl.
*H04W 4/00*    (2006.01)
(52) U.S. Cl. ................... 370/329; 370/230; 370/335; 370/336; 370/395.5; 370/432; 455/503
(58) Field of Classification Search ................... 370/336, 370/230, 312, 329, 335, 390, 395.3, 395.5, 370/432, 442; 455/503, 412.1, 414.1, 450, 455/515, 517; 725/81, 132; 709/204
See application file for complete search history.

(56) References Cited

U.S. PATENT DOCUMENTS

| | | | |
|---|---|---|---|
| 5,878,033 A | 3/1999 | Mouly | |
| 6,411,992 B1 | 6/2002 | Srinivasan et al. | |
| 6,493,762 B1 | 12/2002 | Chen et al. | |
| 2002/0072378 A1 | 6/2002 | Gaal | |
| 2003/0174678 A1* | 9/2003 | Chang et al. | 370/335 |
| 2003/0228861 A1 | 12/2003 | Leung et al. | |
| 2004/0103435 A1* | 5/2004 | Yi et al. | 725/81 |
| 2004/0105402 A1* | 6/2004 | Yi et al. | 370/312 |

FOREIGN PATENT DOCUMENTS

| | | |
|---|---|---|
| EP | 1 180 862 | 2/2002 |
| JP | 2000-115090 | 4/2000 |
| KR | 1020040016066 | 2/2004 |
| WO | WO 02/082834 | 10/2002 |
| WO | WO 03/017693 | 2/2003 |
| WO | WO 03/069507 | 8/2003 |
| WO | WO 2004/002184 | 12/2003 |
| WO | WO 2004/017540 | 2/2004 |
| WO | WO 2004/017541 | 2/2004 |
| WO | WO 2004/017579 | 2/2004 |

* cited by examiner

*Primary Examiner*—Matthew D Anderson
*Assistant Examiner*—Shaima Q Aminzay
(74) *Attorney, Agent, or Firm*—The Farrell Law Firm, LLP

(57) ABSTRACT

A method of providing a multicast and/or broadcast service in a mobile telecommunications network, wherein transmission times for the services are scheduled and scheduling information is transmitted from a network node to a mobile terminal, and wherein the scheduling information is provided according to a predefined schedule.

16 Claims, 4 Drawing Sheets

METHOD FOR PROVIDING A MULTICAST AND/OR BROADCAST SERVICE IN A MOBILE TELECOMMUNICATIONS NETWORK

BACKGROUND OF THE INVENTION

1. Field of the Invention

This invention relates to a broadcast or multicast service in a telecommunications system. More explicitly, but not exclusively, the invention relates to the realisation of a Multicast Broadcast services in a radio access network (RAN) such as in the Universal Mobile Telecommunications Service (UMTS) radio access network in regard of Scheduling information for a Multimedia Broadcast/Multicast Service (MBMS). UMTS concerns a third generation radio network using wideband code division multiple access (W-CDMA) technology.

2. Description of the Related Art

A cellular communications system includes mobile user equipment (UEs), a radio access network (RAN) and one or more core networks (CNs), as illustrated in FIG. 1 for the UMTS case. A detailed overview over the architecture of a cellular telecommunications system of the third generation may be found in the 3GPP specification "UTRAN Overall Description" 3GPP TS25.401 and related specifications. Communication between the Ues 1 and the UTRAN 3 is provided via the Uu interface (Uu), whereas the communication between the UTRAN and the core networks 5 is done via the Iu interface (Iu).

A radio access network includes base stations and radio network controllers or base station controllers (RNC/BSC). The base stations handle the actual communication across the radio interface, covering a specific geographical area also referred to as a cell. The radio network controllers control the base stations connected to it, but in addition perform other functionality like for example the allocation of radio resources and the control of local mobility. An RNC connects to one or more core networks via the Iu interface, to a number of base stations (node B's for the case of UTRAN) via the Iub interface and possibly to one or more other RNCs via the Iur interface. The core network includes a serving GPRS (General Packet Radio Service) support node (SGSN) and a broadcast/multicast-service center (BM-SC). The BM-SC controls the distribution of the data to be transmitted via the MBMS service.

Communications Networks of the third generation (3G) such as the UMTS network provide Multimedia Broadcast Multicast Services (MBMS). MBMS is a point-to-multipoint service in which multimedia data such as audio, images or video data is transmitted from a single source entity to multiple recipients by using an uni-directional bearer service. The MBMS bearer service offers both a broadcast mode and a multicast mode. In the broadcast mode, the data are broadcasted to all users. In contrast, a user needs to subscribe to a particular MBMS service or a group of MBMS services with a service provider in order to receive multicast services. The operator may then announce the service or use a service discovery mechanism to inform users about the range of MBMS services available. If the user is interested in a particular MBMS service, the user joins the service, i.e. the user activates the MBMS multicast service. In this way the user becomes a member of a particular multicast group and indicates to the network that he or she wants to receive the MBMS data of a particular MBMS service.

The area in which a specific MBMS Bearer Service is available is referred to as the MBMS Service Area, or the MBMS Multicast (MC)-service area It is defined individually per MBMS Bearer Service, i.e. the MBMS service area is MBMS service specific. Such a MBMS service area consists of a number of cells. An MBMS MC-service area might not have any relation to other area of the network, such as the UTRAN Registration Areas (URA's), Routing Areas (RAs) or Location Areas (LAs). Thus, an MBMS MC-service area may consist of some cells of a URA, RA or LA, without necessarily including all cells of that URA, RA or LA.

More information regarding MBMS realization in the UTRAN may be found in the corresponding stage-2 document "Introduction of Multimedia Broadcast Multicast Service (MBMS) in the Radio Access Network (RAN)", TS 25.346.v2.6.0.

Transmitting the same data to multiple recipients allows network resources to be shared. In this way the MBMS architecture is designed to enable an efficient usage of radio-network and core-network resources.

In order to initiate a MBMS session, the CN sends a session start command to the RNC. The Session Start command is used to indicate that the core network is ready to send data relating to a particular MBMS service. The Session Start command triggers the establishment of a bearer resource for MBMS data transfer. It is noted that the Session Start occurs independently of activation of the service by the user. This means that a user may activate a particular service either before or after a Session Start.

After receiving the Session Start command, the RNC send MBMS notifications to the UE in order to inform the UEs about forthcoming or even ongoing MBMS multicast data transfers. The RNC manages the use of the radio resources and decides whether the MBMS data will be transmitted using point to multipoint or point-to-point transfer mode on the radio interface. If there are sufficient UEs in a cell, the point-to-multipoint transfer mode is most efficient. If however the number of users in a cell is low, the point-to-point transfer mode may be most efficient. To decide which transfer mode to use, the RNC may perform a counting operation. Subsequently multimedia data relating to a particular MBMS service are transmitted from the CN via the RNC to the UEs during the data transfer phase.

When the BM-SC determines that there will be no more data to send, the CN sends a Session Stop command to the RNC and the bearer resources are released If a user is no longer interested in a particular MBMS service, the user deactivates the service. Accordingly, the user leaves the multicast group if he or she does no longer wants to receive Multicast mode data of a specific MBMS bearer service.

It is noted that the phase subscription, joining and leaving are performed individually per user. The other phases, such as the notification and the data transfer, are performed for a particular service, i.e. for all users interested in the related service.

As of 3GPP RAN2 meeting number 41 (16-20 Feb. 2004), the situation regarding how MBMS will be handled on the Uu interface has again become clearer. The current status of MBMS realization in RAN2 is described in the 3GPP specification "Introduction of Multimedia Broadcast Multicast Service (MBMS) in the Radio Access Network (RAN)" TS 25.346 ( v2.6.0).

During RAN2 meeting number 41, it was decided that there will be MBMS scheduling information provided on an secondary Common Control Physical Channel (SCCPCH), and that this scheduling information would concern the MBMS services provided on this SCCPCH.

Currently, scheduling information is already provided on the GSM/UMTS radio interface for the Cell Broadcast Service (CBS). Like MBMS, CBS is also a broadcast type of service (point-to-multipoint transmission). However CBS is restricted to much lower rates as MBMS and is focussed on text based services.

CBS is specified in the 3GPP specification "Short Message Service Cell Broadcast (SMSCB); support on the mobile radio interface for GSM" (TS 44.012), and 3GPP specification "Broadcast/Multicast Control (BMC) for UMTS" (TS 25.324).

One possibility to implement the scheduling for the MBMS service would be to apply a scheduling procedure in analogy to that described for the CBS service.

For the CBS service (see the specifications TS 44.012 and TS 25.324 for more details), it is exactly described which messages (based on message ids) are going to be sent in timeslots in the coming period. In UMTS, the maximum time period is described to be 2.56 seconds. The messages to be transmitted are indicated by message identifications (message Ids).

A straightforward application of the CBS approach would be to signal in the scheduling message which services are going to be provided within a certain time period. This time period can for example be determined to be the next 50 System Frame numbers (SFNs).

It is an aim of the present invention to improve the scheduling method described above.

SUMMARY OF THE INVENTION

According to one embodiment of the present invention, there is provided a method of providing a multicast and/or broadcast service in a mobile communications network, including transmitting data for a multicast and/or broadcast service from a network node to a mobile terminal, wherein transmission times for transmitting data relating to the service are scheduled and wherein scheduling information is transmitted from a network node to a mobile terminal, and wherein transmission of at least some of said data is delayed so that data relating to said service are grouped together before transmission.

According to another embodiment of the present invention, there is provided a method of providing multicast and/or broadcast services in a mobile communications network, wherein transmission times for the service are scheduled and scheduling information including the start times of the transmission related to a particular multicast and/or broadcast service is transmitted from a network node to a mobile terminal.

According to another embodiment of the present invention, there is provided a method of providing multicast and/or broadcast services in a mobile communications network, wherein transmission times for the services are scheduled and scheduling information is transmitted from a network node to a mobile terminal, and wherein the transmission periods covered by the scheduling information are specific to a particular multicast and/or broadcast service.

According to another embodiment of the present invention, there is provided a method of providing a multicast and/or broadcast service in a mobile communications network, wherein transmission times for the service are scheduled and scheduling information is transmitted from a network node to a mobile terminal, and wherein the scheduling information is provided according to a predefined schedule.

According to another embodiment of the present invention, there is provided a method of providing multicast and/or broadcast services in a mobile communications network, wherein transmission times for the services are scheduled and scheduling information is transmitted from a network node to a mobile terminal, and wherein scheduling information for different multicast and/or broadcast services provided on one channel is grouped together.

According to yet another embodiment of the present invention, there is provided a method of providing a multicast and/or broadcast service in a mobile communications network, wherein transmission times for the service are scheduled and scheduling information is transmitted from a network node to a mobile terminal, and wherein data related to said multicast and/or broadcast service to be transmitted from a network node to a mobile terminal are grouped together before transmission.

BRIEF DESCRIPTION OF DRAWINGS

Embodiments of the present invention will now be described, by example only, with reference to the accompanying figures, whereby.

DETAILED DESCRIPTION OF THE PREFERRED EMBODIMENT

Figure 1:
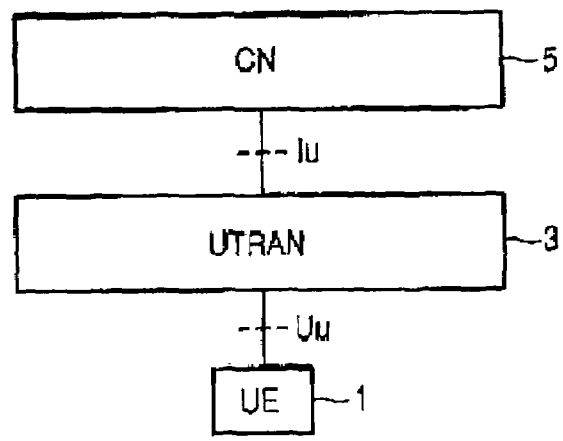
FIGS. 1 and 2 are schematic outlines of a mobile communications network, in which the present invention can be incorporated.
Figure 2:
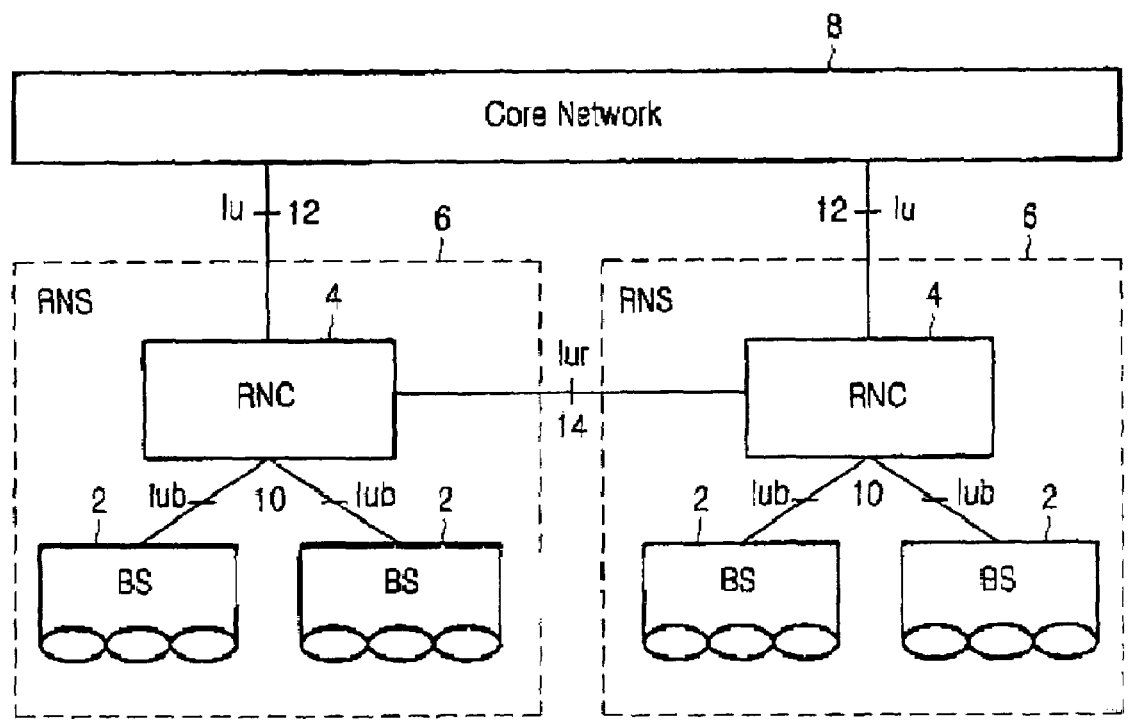

FIG. 2 illustrates the architecture of a radio access network. The RAN comprises base stations 2, such as the so-called Node B's for the UTRAN, and radio network controllers 4 (RNC), also referred to as base station controllers (BSC). The base stations 2 handle the actual communication across the radio interface, covering a specific geographical area also referred to as a cell. The RNCs 4 control the base stations 2 connected to it, and also include other functionality for tasks such as the allocation of radio resources, i.e. the local mobility. The Radio Network Subsystem 6 (RNS) include An RNC 4 and base stations 2. An RNC 4 is connected to one or more core networks 8 via the Iu interface 12, to a number of base stations 2 via the Iub interface 10 and possibly to one or more other RNCs 4 via the Iur interface 14.

In a UMTS network, the Radio Resource Control (RRC) protocol is used across the radio interface, i.e. between the UE and UTRAN. These protocol end points interact by exchanging protocol parameters, by sending messages comprising of one or more information elements.

In order to set up a MBMS session, the RNC receives a respective request from the CN. This MBMS Session Start Request contains a MBMS Service Identification, specifies the MBMS Bearer Service Type and MBMS Session Attributes such as the MBMS Service Area Information or Quality of Service parameters. After the RNC receives the MBMS Session Start Request, it notifies the UEs which are interested in and have activated the particular MBMS service.

The MBMS Session Start Request contains all information necessary to set up an MBMS Radio Access Bearer (RAB). Upon reception of the Session Start message, the RNC executes an MBMS data bearer set up over the Iu interface, and subsequently informs the sending CN of the outcome of the set up in a MBMS Session Start response message.

For a particular MBMS service, data is then transferred via an MBMS RAB between the network and the UE.

In order to set up the connections between the RNC and the UE, the existing transport channel mechanism of the Forward Access Channel (FACH) over Iub is used in case of a point-to-multipoint (ptm) MBMS transmission. A ptm connection is established if the number of counted MBMS users in a cell exceeds a certain operator-defined threshold. Otherwise, a point-to-point (ptp) connection is established over the DTCH as defined for other dedicated services.

The CN sends the MBMS Session Stop command in a similar way to the RNC, and the RNC then notifies the interested and activated UEs of the end of the MBMS session. When the RNC receives an MBMS Session Stop Request, it releases the associated MBMS RAB resource.

Applying a "CBS-Like Solution" for MBMS

As described above a straightforward application of the CBS approach would be to signal in the scheduling message which services are going to be provided within a certain time period. This time period can for example be determined to be the next 50 System Frame numbers (SFNs).

A secondary Control Common Channel may carry 64 kbps, may have Time Transmission Intervals (TTI) of 40 ms and being adapted to carry 8 Transport Blocks (TBs) of each 320 bits at every TTI. Furthermore, a maximum of 8 services could be provided per 4 SFNs, or 100 services in 50 SFNs. For each service occurrence, the MAC identity needs to be identifies (this may for example require 5 bits and 32 services on one SCCPCH).

The scheduling message would then have a maximum length of around 500 bits per 0.5 seconds, generating overall a load of 1 kbps.

The Cell Broadcast Service uses the so-called "Asynchronous Approach". This means that scheduling messages are not sent at fixed timing occasions. Instead, usually in every scheduling message the optimal timing for the next scheduling message is specified, i.e. just after the time period covered by the current scheduling message.

Although this type of solution can also be considered one possible valid solution for MBMS, it can be questioned if this type of straightforward application of the CBS to the MBMS case results in an optimal solution for MBMS or can be further improved.

BEST MODES FOR CARRYING OUT THE INVENTION

Starting from the above described CBS-like solution, the following issues need to be addressed:

1) What is the most efficient way to signal MBMS service scheduling information? Is signaling the contents of every TTI (which MBMS services are going to be transmitted in that TTI) an efficient approach, or are there more efficient approaches for reducing the size of the scheduling information?

2) Should scheduling information be provided at fixed positions in time (also called "synchronous"), or is it beneficial to allow an "asynchronous approach" like in CBS where the time interval between subsequent scheduling message can vary?

3) How do we want to group the scheduling information, e.g. one message for all service on one SCCPCH, one message per service, . . . .)?

In the following all of these issues will be discussed.

First Embodiment

How to Signal MBMS Service Scheduling Information?

A possible solution may be provided by signalling one scheduling indication per TTI, specifying which MBMS services are going to be transmitted. In this way the UTRAN scheduling typically distributes the transmission of the information belonging to a specific MBMS service at random over time. The above described solution is the straightforward application of the CBS solution.

Figure 3A:
FIGS. 3A and B are schematic diagrams illustrating a first scheduling approach for a multicast and/or broadcast service according to the prior art and a second scheduling approach according to one embodiment of the present invention.

However, for MBMS the delay of the service is not very critical. Considering only the delay of the data, a delay of for example up to 0.5 seconds does not pose any problem Referring now to FIG. 3, two different scheduling approaches for one MBMS service are described. In FIG. 3A the scheduling approach of the CBS-like solution is illustrated. UTRAN transmits 1 TB for the service every 40 ms TTI.

Figure 3B:

In FIG. 3B an alternative scheduling approach is illustrated. The information transmitted by UTRAN for this MBMS service is grouped together. UTRAN now transmits 8 TBs every 8 TTIs. Grouping together the information to be transmitted as described above results in a maximum delay of 240 ms.

With the alternative approach as illustrated in FIG. 3B the number of scheduling messages can be reduced. Instead of having to indicate 8 instances at which the MBMS service will be transmitted, only one instance needs to be indicated. As long as the data can be delayed up to a period of time comparable to the scheduling interval covered by the scheduling message, scheduling of "grouped information" as described above is more efficient than scheduling the information separately.

Another advantage of this approach is that scheduling information for a specific MBMS service in bursts rather than spreading it over every TTI provides the UE with more opportunity to perform neighboring cell measurements. Note that in order to make the most time available for neighboring cell measurements, each TTI should preferably only contain data for one MBMS service.

However, the delays introduced by grouping together information as described above should be done with care, as in case that the bursts required to transmit the information become too long, the UE might again get problems with performing measurements.

Start of MBMS Service Transmission

In addition to grouping data together for each MBMS service before transmission as described above, the transmission of scheduling information may be improved by indicating for each MBMS service the next instance or the next instances in which transmission for that MBMS service will start.

The instances can for example be indicated by a list of start SFNs, which identify the starting frame, or a list of start TTIs. However, since TTIs are not numbered, for implementing the latter proposal the TTIs needs to be numbered. This can be achieved by introducing a number for the TTIs, for example at the end of the scheduling message.

Compared to a CBS-like approach, the proposed solutions result in a more efficient way of scheduling information. This may result in smaller scheduling messages. Also, the above described way of transmitting scheduling information facilitates the selection of good opportunities for performing neighboring cell measurements for the UE.

Second Embodiment

Different Time Periods for Different Services

From a UE efficiency point of view, the period which is covered by the scheduling message should be as long as possible: it will enable the UE to plan its measurement periods well in advance and can result in large periods in which the UE can be absent without having to read an MBMS service or scheduling message.

From a UTRAN scheduling efficiency point of view, the period should be as short as possible (preferably no scheduling info) in order to maintain maximum flexibility with respect to which MBMS service to schedule when. If the period covered by the scheduling message is too long, the UTRAN may have to buffer too much data.

This will be illustrated by the following example: Assume that a scheduling message covers 60 seconds. Consider now that immediately after a scheduling message has been sent, continuous downlink data for a 256 kbps service starts to arrive. In this case the UTRAN needs to buffer 1.9 MB of data for this particular MBMS service.

On the other hand, for MBMS services of a lower rate longer periods of inactivity might be advantageous. These periods of inactivity may for example be 30 seconds long.

It might be thought that a potential disadvantage is that to allow scheduling periods to be of different length for different services might generate more service asynchronism between cells of different RNCs, for the following reason. In MBMS a terminal may combine the MBMS data received from different cells in order to improve the quality of reception. This requires that the transmission of the data in the two cells is, to some extent, aligned in time. However, such combining is not supported between cells of different RNCs. Hence, this asynchronism/misalignment between cells of different RNCs is not considered to be a real drawback in practice.

Consider a second example: for a text based service and a low rate service of 1 kbps, a 10 second discontinuous transmission (DTX) decreases the UE power for reading the scheduling message by a factor of 20 when compared to 0.5 s scheduling message interval, and requires very little buffer capacity in the RNC. For the text based service the required buffer capacity is almost zero, and for the 1 kbps service it is 1.2 kB.

In the following it is discussed what the longest sensible period is for which scheduling information could be provided. Assuming a typical longest discontinuous reception (DRX) cycle of 5 seconds, and assuming that it will take about 1 longest DRX cycle to notify UEs of a service unavailability, and 2 DRX cycles for session availability, in principle an expected interruption of more than 15 seconds could already be handled by temporarily making the service unavailable. However, this will require the use of additional notification indicators (NI). Therefore, it appears that to use the service available->service unavailable->service available transition sequence is only advantageous if a service interruption on the order of a minute or more is expected.

Since the SFN cycle covers a 40 seconds period, a straightforward compromise is to allow service interruptions up to one SFN cycle to be signaled with the scheduling information.

Above a solution has been described which allows the scheduling information to cover different periods for different services. This can for example be achieved by specifying a smart mechanism with respect to when the UE is required to read the next scheduling message (see Third Embodiment below).

By allowing the scheduling information to cover different time periods for different services, the UE does not have to read unnecessarily additional scheduling message. In this way the power consumption can be reduced.

The advantage of providing different scheduling time periods for different services is illustrated by the following example.

It is assumed that the UTRAN can indicate ("predict") the scheduling information for a high rate service for a period of 1 second in advance, and for a low rate service for up to a minute. In this case a UE only interested in the low rate service will only need to read the scheduling message every minute.

On the other hand, if the scheduling information would only cover 1 second for both high and low rate services, even the UE which is only interested in the low rate service is required to read a scheduling message every second.

Third Embodiment

Synchronous <->Asynchronous Scheduling Information

In the CBS solutions, the scheduling information is not necessarily provided at fixed points in time. Instead, a scheduling message follows the last message sent in the previous scheduling period.

This approach is referred to as "asynchronous", and provides additional flexibility to the UTRAN for the following reason. If for example the scheduling information for a certain scheduling period increases, but the UTRAN wants to keep the scheduling messages within a certain size, the UTRAN can decide to decrease the scheduling period covered by each scheduling message.

An alternative is provided by the so-called "synchronous approach": Here, the MBMS scheduling information is provided according to a pre-determined schedule. The information regarding the schedule of the scheduling information is typically provided to the UE by a signaling means or message other than the actual scheduling message.

If a UE misses a scheduling message, for example due to an incorrect cyclic redundancy check (CRC), the UE acts in a similar way in both the asynchronous and the synchronous approach. In both cases the UE has to read the MBMS point-to-multipoint traffic channel (MTCH) on the SCCPCH continuously and handles any information it receives for the MBMS services it is interested in, until the next scheduling message is received.

However, the situation is more complicated for the asynchronous approach, i.e. in case that the scheduling information is allowed to have different periods for different services.

This will be described by means of the example below.

A scheduling message send at the time SFN=0 has the following contents:
Service 1: SFN=10, SFN=20, SFN=30, SFN=40
Service 2: SFN=210

A UE which is only interested in MBMS service 2 does not read the SCCPCH until SFN210. Then the UE continues to read the SCCPCH after SFN210 until it receives the next scheduling message. The next scheduling message may for example be sent at SFN250.

Thus the approach of receiving the SCCPCH after the last know MBMS Service "start-TTI" might consume a lot of power, and might even consume more power than in the case that the UE reads the scheduling message regularly. Therefore, this asynchronous approach is disadvantageous.

On the other hand, if the scheduling messages are provided at known occasions, and scheduling messages are sent according to the general rule that any scheduling message should include all start-TTI's up to the next scheduling message after the highest indicated start-TTI, the UE only needs to read the first scheduling message after the last indicated start-TTI for the service in which the UE is interested.

Below an example is described for a synchronous scheduling approach.

A scheduling message is provided at every SFNmod64=0 and the scheduling message includes the following information:

Service 1: SFN=10, SFN=20, SFN=30, SFN=40
Service 2: SFN=210

A UE interested in service 1 needs to read the next scheduling message at SFN=64. Thus it listens to any transmissions between SFN=40 and SFN=64. The UE only interested in MBMS service 2 reads the next scheduling message at SFN=256.

It is noted that the UTRAN may indicate the SFN of a future scheduling message in case the UTRAN knows in advance that the service is not going to be provided for quite a long period to come, but does not know at which point in time it will start to transmit the data again.

Therefore, synchronous scheduling is considered the more advantageous approach. Accordingly, scheduling information is provided in accordance with a predefined schedule. Thus, the UE does not need to have received the previous scheduling message in order to know the timing of the next scheduling message.

Together with the approach described above in the second embodiment, a scheme is realized in which UEs only need to read scheduling messages which are relevant for them. This will result in a reduction of the power consumption for UEs which are only interested in services for which the scheduling information can be provided well in advance.

Fourth Embodiment

How to transport/group the scheduling information over the SCCPCH

In a CBS-like solution, all the scheduling information to be provided in the next scheduling period is collected and transmitted in one message.

In this way reception of scheduling information is facilitated for UEs interested in multiple CBS messages, since all the relevant information is provided in one message rather than in more than one message transmitted as different occasions.

An alternative approach is to provide the scheduling information for different MBMS services at different points in time instead of collecting all the information in one message.

The following approaches for providing MBMS scheduling information are considered useable:

1) a solution in which the MBMS scheduling information is provided grouped for all MBMS services provided on this SCCPCH;
2) a solution in which the MBMS scheduling information for different MBMS services might be provided at different points in time.

The first approach might be beneficial for UEs interested in multiple services and result in a lower UE power consumption for these situations.

The second approach might be beneficial for UEs interested in a limited number of MBMS services (e.g. only one), since they do not need to read a scheduling message signalled at an additional time instance.

EXAMPLES

Figure 4:
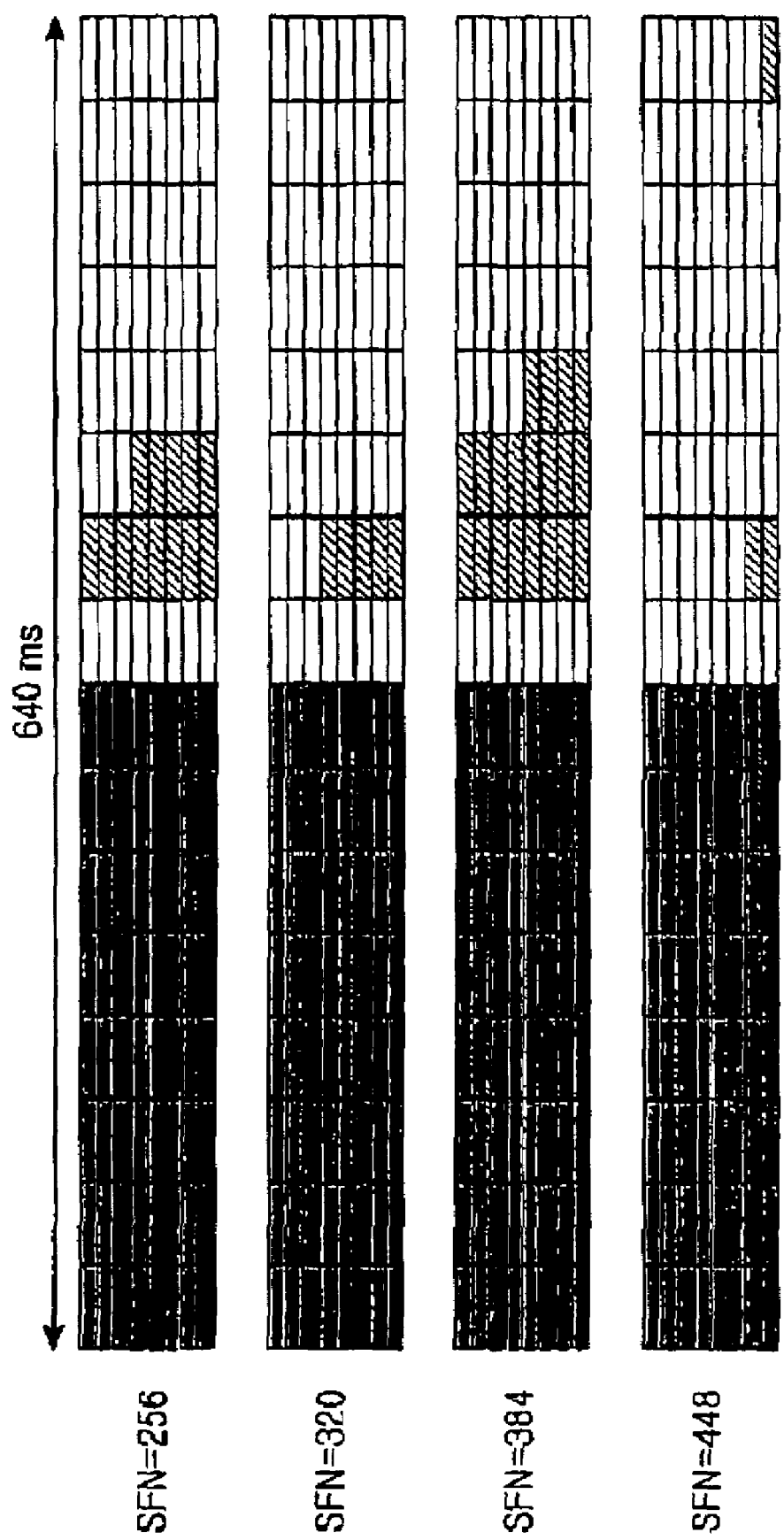
FIG. 4 is a schematic diagram illustrating the scheduling approaches for three different multicast and/or broadcast services incorporating different embodiments of the present invention.

Referring now to FIG. 4, an example of providing three different MBMS services on one SCCPCH will be described. In this example different elements of how to provide scheduling information for a MBMS service as described above in the first three embodiments are combined. The approach combines the element of grouping of data and indicating the start SFNs as described in the first embodiment, the element of providing scheduling information having different periods for different MBMS services as described in the second embodiment and the element of providing a synchronous schedule as described in the third embodiment:

In this example, on a 64 kbps SCCPCH, three services are provided:

1) a 32 kbps service (MBMS service 1, indicated by dark shading);
2) a variable rate service with a delay tolerance of a 640 ms (MBMS service 2, indicated by light shading); and
3) a low rate service with a large delay tolerance (MBMS service 3, indicated by hatching).

The scheduling information is provided every 640 ms (i.e. in SFN 256, 320, . . . .). The table below indicates the contents of the scheduling messages transmitted at SFN256, SFN300, SFN384 and SFN448.

| SFN256: | SFN320: | SFN384: | SFN448: |
| --- | --- | --- | --- |
| MBMS Service1: 256 | MBMS Service1: 320 | MBMS Service1: 384 | MBMS Service1: 448 |
| MBMS Service2: 296 | MBMS Service2: 360 | MBMS Service2: 424 | MBMS Service2: 488 |
| MBMS Service3: 508 | MBMS Service3: 508 | MBMS Service3: 508 | MBMS Service3: 508 |

Figure 5:
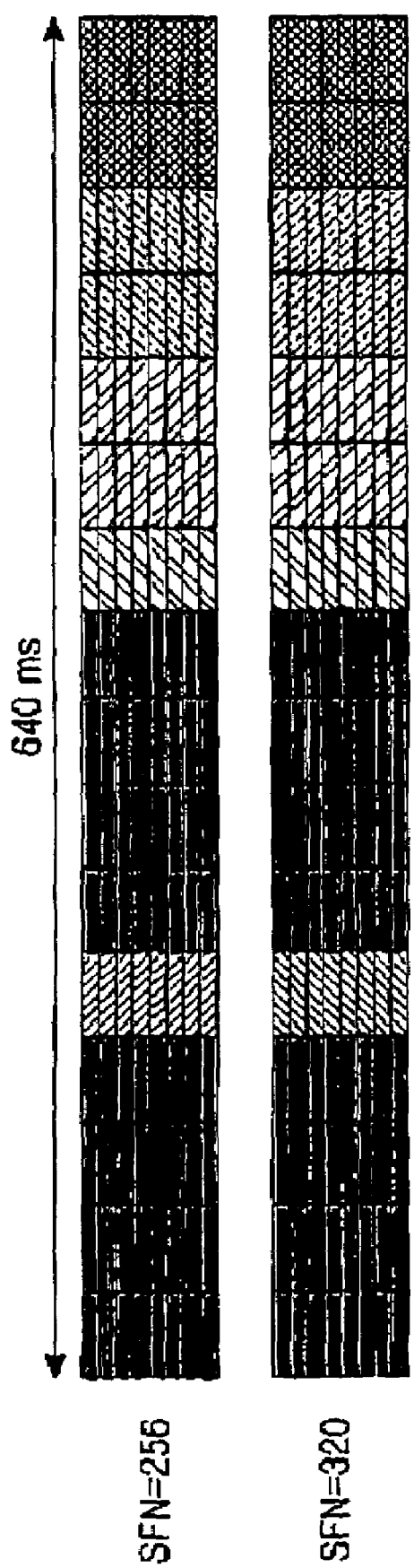
FIG. 5 is a schematic diagram illustrating the scheduling approaches for six different multicast services incorporating yet different embodiments of the present invention.

It can be seen from the table that the first scheduling message transmitted at SFN256 indicates the start transmitting times for Services 1, 2 and 3 as SFN256, SFN296 and SFN508, respectively, The second scheduling message transmitted at SFN320 indicates the start transmitting times for Services 1, 2 and 3 as SFN320, SFN360 and SFN508, respectively, Referring now to FIG. 5 another example of providing six different MBMS services on one SCCPCH is illustrated. Each of these six MBMS services is indicated by a different style of shading or hatching.

Again the scheduling information is provided every 640 ms, and the two scheduling messages transmitted at SFN256 and SFN320 are illustrated. It can be seen from FIG. 5 that the SCCPCH is highly loaded by providing six different MBMS services Although the present invention has been described in the context of Multicast Broadcast services in the UMTS RAN, it is appreciated that it may also be applied to other similar systems. For UMTS, it is expected to be applicable to Release 6 and later releases.

It is to be understood that the various aspects of the different embodiments described above may be implemented individually or in any possible combination.

It is to be understood that the embodiments described above are preferred embodiments only. Various features may be omitted, modified or substituted by equivalents without departing from the scope of the present invention defined in the accompanying claims.

What is claimed is:

1. A method of providing a Multimedia Broadcast/Multicast Service (MBMS) in a mobile telecommunications network
wherein each transmission time for transmitting each data relating to different MBMS services is scheduled and scheduling information is transmitted using one scheduling message from network node to a mobile terminal, and
wherein transmission periods covered by the scheduling information are specific to a particular multicast and/or broadcast service.

2. The method according to claim 1, wherein the scheduling information is provided periodically at predefined times.

3. The method according to claim 1, wherein the scheduling information is provided for a plurality of MBMS services.

4. The method according to claim 1, wherein the scheduling information includes a start time of the data transmission for one or more MBMS services.

5. The method according to claim 4, wherein one or more system frame numbers are specified at which data transmission is to be started.

6. The method according to claim 4, wherein one or more time transmission intervals are specified at which data transmission is to be started.

7. The method according to claim 1, wherein the scheduling information includes a duration of the data transmission for one or more MBMS services.

8. The method according to claim 1, wherein the scheduling information includes an end of the data transmission for one or more MBMS services.

9. The method according to claim 1, wherein the one scheduling message includes the scheduling information for a predetermined period of providing services.

10. The method according to claim 1, wherein the one scheduling message includes the scheduling information for a plurality of MBMS services.

11. The method according to claim 1, wherein transmission of at least some of said data is delayed such that data relating to said MBMS services are grouped together before transmission.

12. The method according to claim 1, wherein the transmission periods covered by the scheduling information for the different MBMS services have different lengths.

13. The method according to claim 1,
wherein scheduling information comprises the different MBMS services provided on one channel.

14. The method according to claim 13, wherein the scheduling information comprises the different MBMS services on a particular secondary common control physical channel.

15. The method according to claim 13, wherein the scheduling information for all MBMS services provided on said channel is grouped together.

16. The method according to claim 11, wherein a maximum delay for a particular MBMS service is predetermined.

* * * * *